Jan. 2, 1923.
R. H. HEARN.
GATE.
FILED MAR. 21, 1921.
1,440,874
2 SHEETS-SHEET 1
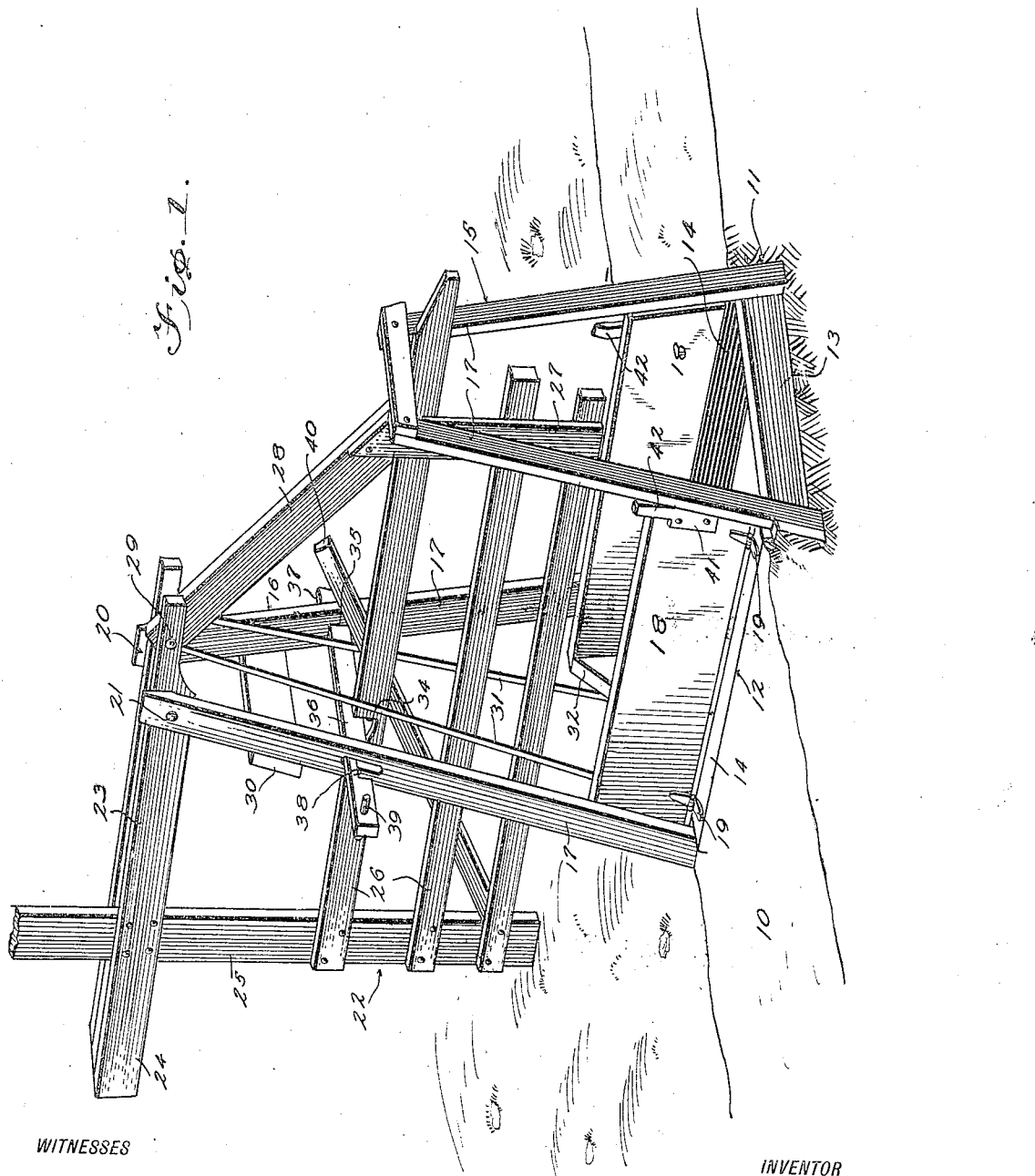
WITNESSES
INVENTOR
R. H. Hearn.
BY
ATTORNEYS

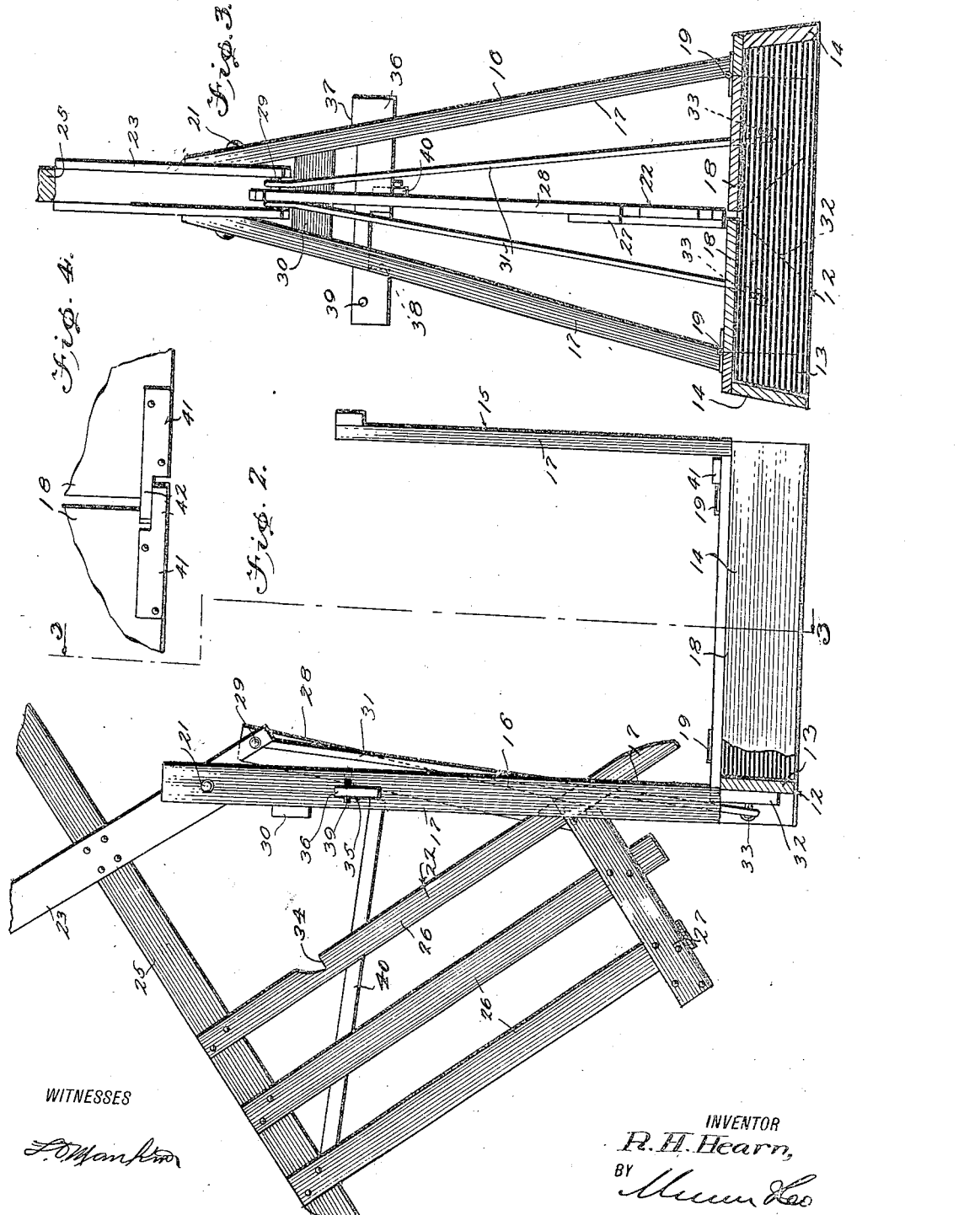

Patented Jan. 2, 1923.

1,440,874

UNITED STATES PATENT OFFICE.

ROBERT H. HEARN, OF DYER, TENNESSEE.

GATE.

Application filed March 21, 1921. Serial No. 454,059.

*To all whom it may concern:*

Be it known that I, ROBERT H. HEARN, a citizen of the United States, and a resident of Dyer, in the county of Gibson and State of Tennessee, have invented certain new and useful Improvements in Gates, of which the following is a specification.

This invention relates to improvements in gates and more especially to those of that type adapted for controlling a road or highway, as for instance on a farm, which will serve to prevent or deter the passage of stock when the gate is closed, and which may be employed in connection with a gully or irrigation ditch, as a bridge over which persons or vehicles may pass, while serving as a cattle guard to prevent stock from passing thereover, but so constructed as to permit the travel of cattle when so desired.

A further object of the invention is to provide an improved gate of the above class which may be operated, that is opened or closed from either side of the gate, the gate being adapted to be operated by a series of plates or leaves preferably arranged in the form of trap doors when a vehicle drives upon the same, so that they may be swung to the same plane or in parallelism with each other together with means for operating the gate, said means for holding the plates in closed position being in the form of a counter-weighted barrier and having novel means for locking or retaining the gates in a closed or open position positively against movement, unless released manually, said means when employed to hold the gate in a closed position preventing the opening thereof by an automobile or other vehicle approaching to cross the same as would be otherwise possible.

Other and further objects of my invention will be apparent from the further description taken in connection with the accompanying drawings, wherein Figure 1 is a perspective view of the improved gate in a closed position.

Figure 2 is an elevation of the gate showing the same in an open position, portions being broken away and shown in section.

Figure 3 is a vertical sectional view taken on the line 3—3 of Figure 2, and

Figure 4 is a fragmentary plan view of the plates and bracing means therefor.

Referring to the drawings in detail wherein like reference characters designate like parts throughout the same, my improved gate is shown arranged across a road, highway or path 10 which may be crossed by a line of fencing, gully or ditch in such a manner that the gate proper will form a continuous or unbroken road surface along the road or path which is controlled and a combined bridge and cattle guard. As shown, the gate is arranged in a pit or depression 11 which may be especially formed in the ground by digging or the like, the pit having a boxed-in curbing or curb wall in the form of a rectangular frame of wood or other suitable material generally designated at 12 and having end members 13 connecting longitudinal members 14 in parallel relation and at spaced points from the ends of the longitudinal members to accommodate the lower extremities of inverted upright V-shaped frames 15 and 16 at opposite sides of the road. These frames comprise outwardly diverging or upwardly converging side members 17 which have their lower ends secured to the side members 13 at the outer faces thereof and against the inner faces of the projecting ends of the longitudinal members 14, thus rigidly securing and bracing the uprights in position, as well as reinforcing the base frame formed by the boxed-in curb wall or curbing 12, so as to span the roadway.

The frame or curbing is closed by a series, preferably a pair of leaves or plates 18 in the form of trap doors which are arranged to extend longitudinally of the rectangular frame across the roadway, each plate being hinged at its outer edge to the curbing frame at the ends thereof, as indicated at 19, and by reason of the fact that the side walls of the curbing frame are of less height than the longitudinal member 14 or walls, the excess in height being equal to the thickness of the plates or leaves 18, when the plates are folded down in the same plane so as to close the pit and form a continuous or unbroken road surface, their upper faces will lie flush with the roadway or with the upper edges of the longitudinal members or walls of the curbing or base frame.

At the longitudinal edges or sides of the frame, the plates or leaves are located and at the other side or end opposite the upright inverted V-shaped frame 15, the frame 16 is located in such a manner as to extend considerably above the frame 15 with the upper ends thereof spaced apart, as indicated at 20 in order to pivotally support as indicated at 21, by a pivot or trunnion extending transversely through the spaced portions, a counter-balanced barrier or picketed obstruction 22 for vertical pivotal or swinging movement across the roadway and between the spaced uprights. This barrier consists of a bar 23 comprising spaced side members directly engaged by the pivots and provided with a plurality of adjustment apertures for this purpose in order to insure proper operation, and cooperation and engagement thereof with the upright 15 at the opposite side of the roadway. It will be observed that the bar 23 is pivoted to the upright 16 near its inner end and when the barrier is in such position as to extend across the road and between the uprights to form an obstruction, said bar extends horizontally in an outward direction at its counter-weighted end 24. Arranged perpendicularly to the bar 23 is a somewhat longer bar 25 which extends considerably above the bar 23 when the latter is horizontally disposed to assist in the counter-balancing thereof, while the depending portion serves to form one end of the barrier or gate proper 22 formed by a series of horizontal bars 26 arranged in spaced relation and rigidly attached to the lower portion of the bar 25 so as to extend at right angles in a plane substantially parallel to the counter-weighted bar in such a manner that the upper panel, at least, of the barrier 22 will be disposed to engage beneath the top portion or cross member of the upright 15 limited in its upward movement at the crotch thereof. The bars 26 are rigidly connected in fixed relation as specified, through the medium of a cross or end member 27 in parallelism with the bar 25, the upper projecting end of the member 27 being in turn connected to the short arm of the bar or lever 23 and between the spaced side portions thereof, by means of a diagonal bar or brace 28 through the medium of a removable cross pin 29, engaged in opposed apertures in said counter-weight bar.

The spaced side members of the uprights 16 are connected by a cross brace 30 spaced from the upper ends thereof and in position to hold the side members of the upright in fixed relation to each other. At the point of connection of the brace 28 with the short arm of the counter-weighted bar or lever 23, connection is afforded between the pin 29 and the plates or leaves 18 through the instrumentality of vertically disposed links 31, said links branching outwardly and downwardly in divergent relation and having connection with said plates adjacent the ends thereof. For this purpose, the end members or blocks 32 are secured to the bottom faces of the plates to extend at right angles beyond the adjacent side member 13 of the curbing frame and are provided with trunnions 33 by which connection is made pivotally with the lower ends of the links. The top bar of the barrier is provided with a notch 34 and this notch is disposed between the side members of the upright 16 when the barrier is in an obstructing or closed position. The opposed sides of the upright 16 in horizontal alignment with the notch 34 are provided with vertical slots 35 accommodating a sliding bolt 36 having reduced end portions by which it may be inserted through the slots and across the space between the opposed sides of the uprights, while the top portion of the enlarged end thereof is provided with a shoulder 37 facing inwardly so as to engage the outer face of the adjacent side member of the upright so as to limit the sliding movement of the bolt. The bolt is provided with a notch 38 at the lower edge thereof, to one side of its longitudinal center which will be disposed out of the path of the notch 34 in the upper bar of the barrier when the bolt is so positioned, thus retaining the barrier in a closed position, which is normally assumed owing to the counter-balanced or counter-weighted construction, especially of the bar or lever 23. In assuming this position, the short arm of the bar will swing upwardly, thus simultaneously opening or raising the plates 18 which cooperate with the barrier at the lower portion of the passage in order to complete the obstruction. The plates may be disposed in inclined or vertical positions as desired.

When the bolt is in released position, it is engaged by a cross pin 39 which retains the bolt against displacement in the opposite direction while still permitting the necessary sliding movement thereof to dispose its notch 38 in alignment with or above the notch of the upper bar of the barrier in order that the barrier may be swung outwardly to an open position from that spanning or obstructing the passage or roadway to an inclined position by suitable pressure being exerted on the plates 18 so as to cause the same to swing downwardly into the same plane from the upright position, in which said plates are located, substantially in parallelism. In order to hold the barrier of the gate in this position, together with the plates or leaves, except when it is desired that the same automatically return to a closed position under the action of the counter-weighted bar or counter-balance after an automobile, or other vehicle has passed over the same, there is secured diagonally to the barrier leading from the lower outer corner thereof adjacent the lower end of the bar 25 a diagonal brace 40, the free end of which terminates in spaced relation to the bottom edge of the brace 28 in such a manner that when the free end of the brace 40 has passed outwardly of the bolt 36 it is limited in its movement by engagement of the brace 28 with the bolt, the movement thereof being accommodated by the notch 38, said bolt may be slid into position between the free end of the brace and the adjacent edge of the brace 28 limited by the shoulder 37, thus preventing the counter-balancing action from closing the barrier and raising the plates, whereby a continuous or unbroken road surface will be presented along the roadway, over a gully, ditch or other obstruction or at the intersection of a line of fencing, according to the circumstances. In order to limit the movement of the plates 18 to positions in the same plane and to brace the same, a pair of interfitting lugs 41 are secured to the top faces of said plates and are provided with reduced end portions projecting beyond their inner edges and interlocking or interfitting, as shown at 42 so as to overlie the opposed plates when the latter are disposed to rest upon the upper edges of the sides 13 of the base or curbing frame. Obviously, when the device is operated, as described, so as to open the barrier by swinging the same laterally and holding it in an open position by the locking device or bolt, a continuous or unbroken road surface over which the cattle may travel is produced but ordinarily, the stock will be prevented from passing over the passage or roadway, by the barrier produced. On the other hand, foot passengers or vehicles may readily pass, the device being operated to produce a continuous road surface or broken roadway as desired.

Having thus described my invention what I claim as new and desire to secure by Letters Patent is:—

1. A device of the character specified, comprising leaves hinged to swing to vertical or substantially horizontal positions, means for constraining the leaves to swing together, a counter-weight bar adapted to extend longitudinally of the leaves above the same and connected therewith to swing said leaves upward when the counter-weight bar is swung inwardly and upwardly into approximately horizontal position, and means for locking the barrier in the last named position, said means also serving to hold the leaves in their upward position and movable in the path of the barrier, said means also serving to hold the barrier and the leaves in open positions, with the leaves horizontally disposed and the barrier swung upwardly to a vertical position.

2. In combination with an open frame adapted to be arranged at a gate-way and a series of plates hinged to the frame to swing to parallel planes substantially perpendicular to the plane of the frame or into the same plane to cover said frame, means for constraining said plates to swing in unison, a support at each end of the frame, a counter-weight bar pivoted to one of the supports and normally extending longitudinally of the frame in an outward direction, a connection between the bar and the plates for holding the latter in open positions and causing movement thereof in unison, when the counter-weight bar is horizontal, and a rigid barrier suspended below and beyond the inner end of the bar to operate between said supports above the plates.

3. In combination with an open frame adapted to be arranged at a gate-way and a series of plates hinged to the frame to swing to parallel planes substantially perpendicular to the plane of the frame or into the same plane to cover said frame, means for constraining said plates to swing in unison, a support at each end of the frame, a counter-weight bar pivoted to one of the supports and normally extending longitudinally of the frame in an outward direction, a connection between the bar and the plates for holding the latter in open positions and causing movement thereof in unison, when the counter-weight bar is horizontal, and a barrier suspended below and beyond the inner end of the bar to operate between said supports above the plates, one of said supports serving to engage the barrier to limit the upward movement thereof to an obstructing position when the gate is closed, and additional means for holding the gate positively in an open or closed position, said means serving to permit automatic closing.

4. A gate of the class described comprising a base frame, plates hinged thereto in the manner of trap doors, upright substantially inverted V-shaped frames at each end of the base frame, a counter-weighted bar pivoted near one end to one of the uprights, a barrier suspended beneath and inwardly of the bar, and having a slatted structure adapted to engage the opposite upright to limit the closing movement thereof, links connecting the short end of said bar with the hinged plates to open the latter when the barrier is moved to closed position, the outer ends of the bar projecting beyond the barrier at one side, and interlocking reinforcing means for the plates.

5. A gate of the class described comprising a base frame, plates hinged thereto in the manner of trap doors, upright substantially inverted V-shaped frames at each end of the base frame, a counter-weighted bar pivoted near one end to one of the uprights, a barrier suspended beneath and inwardly of the bar, and having a slatted structure adapted to engage the opposite upright to limit the closing movement thereof, links connecting the short arm of the bar with the hinged plates to open the latter when the barrier is in the last named position, the outer ends of the bar projecting beyond the barrier at one side, interlocking reinforcing means for the plates, said links being connected to the plates below the bottom faces thereof, said barrier comprising a vertical cross bar connected to the long arm of the first named bar intermediately of the ends thereof and extending above and below the same, the slatted frame being fixed to the lower portion of the vertical bar, a brace between the slatted frame and the short arm of the first named bar, at the point of connection of the links therewith, and means carried by one upright frame to engage the barrier for holding the same in open or closed positions.

6. A gate of the class described comprising a base frame, plates hinged thereto in the manner of trap doors, upright substantially inverted V-shaped frames at each end of the base frame, a counter-weighted bar pivoted near one end to one of the uprights, a barrier suspended beneath and inwardly of the bar, and having a slatted structure adapted to engage the opposite upright to limit the closing movement thereof, links connecting the short arm of the bar with the hinged plates to open the latter when the barrier is in the last named position the outer ends of the bar projecting beyond the barrier at one side, the slatted barrier having a notch in the upper portion thereof, a diagonal brace on the slatted barrier and having one end thereof spaced from the opposite side of said barrier, and a notched bolt slidably mounted in the upright to which the first named bar is pivoted for cooperation with the notched portion or slat of the barrier and the end of the brace to hold the barrier and plates in closed positions to obstruct the entrance, or in open position as desired, said parts normally moving to closed position.

ROBERT H. HEARN.